United States Patent [19]

Wirth

[11] Patent Number: 5,038,896
[45] Date of Patent: Aug. 13, 1991

[54] BRAKE CYLINDER FOR RAIL VEHICLES

[75] Inventor: Xaver Wirth, Ismaning, Fed. Rep. of Germany

[73] Assignee: Knorr-Bremse AG, München, Fed. Rep. of Germany

[21] Appl. No.: 507,789

[22] Filed: Apr. 12, 1990

[30] Foreign Application Priority Data

Apr. 12, 1989 [DE] Fed. Rep. of Germany ....... 3912037

[51] Int. Cl.⁵ ...................... B60T 13/10; B60T 13/04; B61H 13/22; F16D 65/32
[52] U.S. Cl. .................................... 188/153 R; 92/24; 188/59; 188/170; 188/265
[58] Field of Search ............... 188/153 R, 59, 67, 170, 188/72.6, 265, 353, 71.1, 72.3, 72.4, 167, 106 F; 92/24, 25, 29, 32; 303/9.76, 71, 89, 9, 13

[56] References Cited

U.S. PATENT DOCUMENTS

| | | | |
|---|---|---|---|
| 3,791,491 | 2/1974 | Tickle | 188/59 X |
| 4,007,815 | 2/1977 | Acre | 188/265 |
| 4,063,622 | 12/1977 | Coleman et al. | 188/265 X |
| 4,116,113 | 9/1978 | Leclerc | 188/170 X |
| 4,215,767 | 8/1980 | Shirey | 188/265 |
| 4,393,962 | 7/1983 | Kobelt | 188/59 X |
| 4,537,113 | 8/1985 | Stoll et al. | 92/24 |
| 4,577,732 | 3/1986 | Gottling | 188/265 X |
| 4,586,425 | 5/1986 | Redman et al. | 92/24 X |
| 4,592,451 | 6/1986 | Persson | 188/59 X |
| 4,795,005 | 1/1989 | Wirth | 188/153 R |

*Primary Examiner*—Douglas C. Butler
*Attorney, Agent, or Firm*—Pollock, Vande Sande & Priddy

[57] ABSTRACT

In a brake cylinder (1) for vehicle brake systems a service and a parking brake are provided within a common housing (25). The parking brake (41) acts on a brake actuating member (37) of the brake cylinder (1) against spring force via a parking brake piston (57) which can be loaded preferably by a pressure medium, and can be locked in the parking brake position by a locking mechanism (43) that acts mechanically, i.e., pressure independently, and that is applied automatically subject to spring force when the parking brake is actuated. The locking mechanism (43) is released preferably by loading a locking piston (59) with a pressure medium in such a manner that the parking brake piston can be returned automatically subject to spring force into its release position and is mechanically maintained in this position.

5 Claims, 3 Drawing Sheets

BRAKE CYLINDER FOR RAIL VEHICLES

FIELD OF THE INVENTION

The invention relates to a brake cylinder for rail vehicles.

BACKGROUND OF THE INVENTION

For brake cylinders for vehicles, which comprise not only a service brake but also a parking brake, it is known to constitute the parking brake as a spring-loaded brake. Such spring-loaded brakes apply as soon as the releasing pressure loses pressure, i.e., they are held in release position by the release pressure of a pneumatic or hydraulic pressure medium and are moved into the braking position when the pressure drops due to spring tension. The result of this drop in pressure is that, in the case of rail vehicles, automatic braking is necessary if the pressure of the pressure medium system should fail.

In addition, brake cylinder constructions with a spring-loaded member are known in which said spring-loaded member can be locked with a pawl mechanism, and thus cannot be released automatically. The pawl mechanism is disengaged through a special pressure circuit when the parking or spring-loaded brake is to be applied. The drawback of such designs is that, to clamp the spring-loaded member, a minimum pressure must be attained in order to release the brake. Even disengaging the spring-loaded member under load is problematic.

Finally, in the case of caliper designs, directly acting cylinders are known, i.e., service brake cylinders with parallel operating parking brake cylinders, wherein two pressure circuits are used independently of one another. However, such a combination of a service brake or active cylinder with a parking brake cylinder arranged parallel thereto is possible only with the advantageous design features of caliper constructions. In the case of caliper designs, such combinations are problematic with respect to construction space and synchronizing the function.

SUMMARY OF THE INVENTION

The object of the invention is to provide a brake cylinder for brake systems of vehicles, in particular rail vehicles, in which said brake cylinder has in a restricted space a service brake and a parking brake within a common housing and offers the possibility of applying the parking brake active in such a manner that unintentional braking is avoided. In particular, it shall be prevented that rail vehicles in the open field brake at random, i.e., automatically, and can be released only by means of time-consuming measures. The engaged parking brake remains in effective position independently of a supply of pressure medium, i.e., even if there is a pressure drop in the pressure medium system of the vehicle. It is also possible to perform the release independently of the brake load, i.e., to carry out the unlocking from the parking brake position without having to unlock against the brake force acting thereon.

When the brake cylinder has a common housing, the service brake and the parking brake are provided as completely separate systems, wherein, to engage the parking brake, an external force, such as a hydraulic medium, is required for only a short time to move the parking brake piston, since both the attained parking brake position and the release position can be locked mechanically, and thus do not require any pressure to be maintained. The parking brake piston, which, when loaded with pressure subject to the tightening of a packet of springs, engages the parking brake, may be regarded simultaneously as a component of the locking mechanism, which, upon reaching the parking brake position, locks automatically into the block or lock position with respect to the parking brake piston, in such a manner that a parking brake position that persists for any desired length of time is obtained. Even the release position of the parking brake can be locked and is effective for any desired period of time.

The parking brake piston is moved out of the parking brake position into the release position after the release motion of the locking piston against spring force, which must be actuated to this end for only a brief period of time by means of an external force, for example a pneumatic or hydraulic pressure medium. For this reason, it is possible to move the locking piston, e.g., with a so-called "hand pump device," out of its locking position into its release position against the spring force. The components of the parking brake system, the service brake system and the locking mechanism are not subject to any risk of vibration due to their constructional arrangement, since all parts are prestressed in each state. The components may be regarded as simple since they comprise only rotary parts or spherical elements. There is also no danger of wear as is the case of locking pawls, which must be released against high pressure.

BRIEF DESCRIPTION OF THE DRAWINGS

The invention will now be described with reference to the accompanying drawings, in which an embodiment of the invention is shown for purposes of illustration, and in which.

DESCRIPTION OF PREFERRED EMBODIMENT

Figure 1:
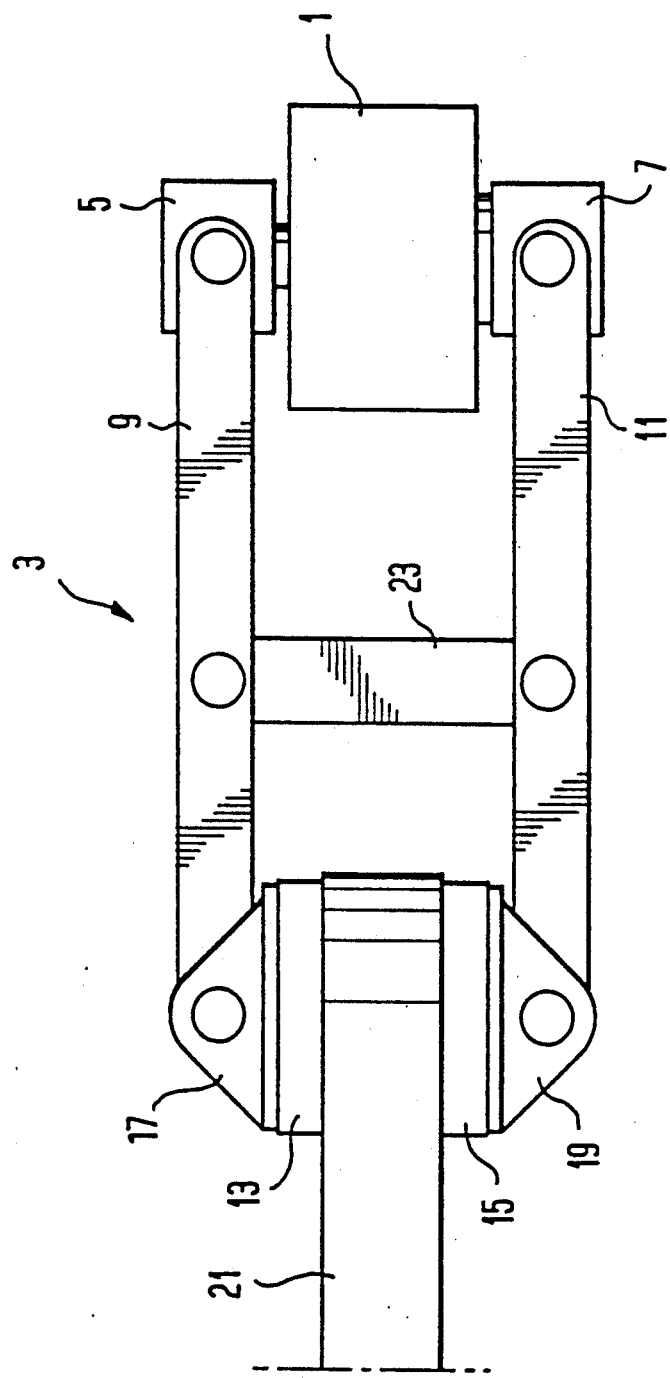
FIG. 1 is a schematic view of a caliper arrangement enfolding a brake disc using the brake cylinder of the invention.
Figure 2:
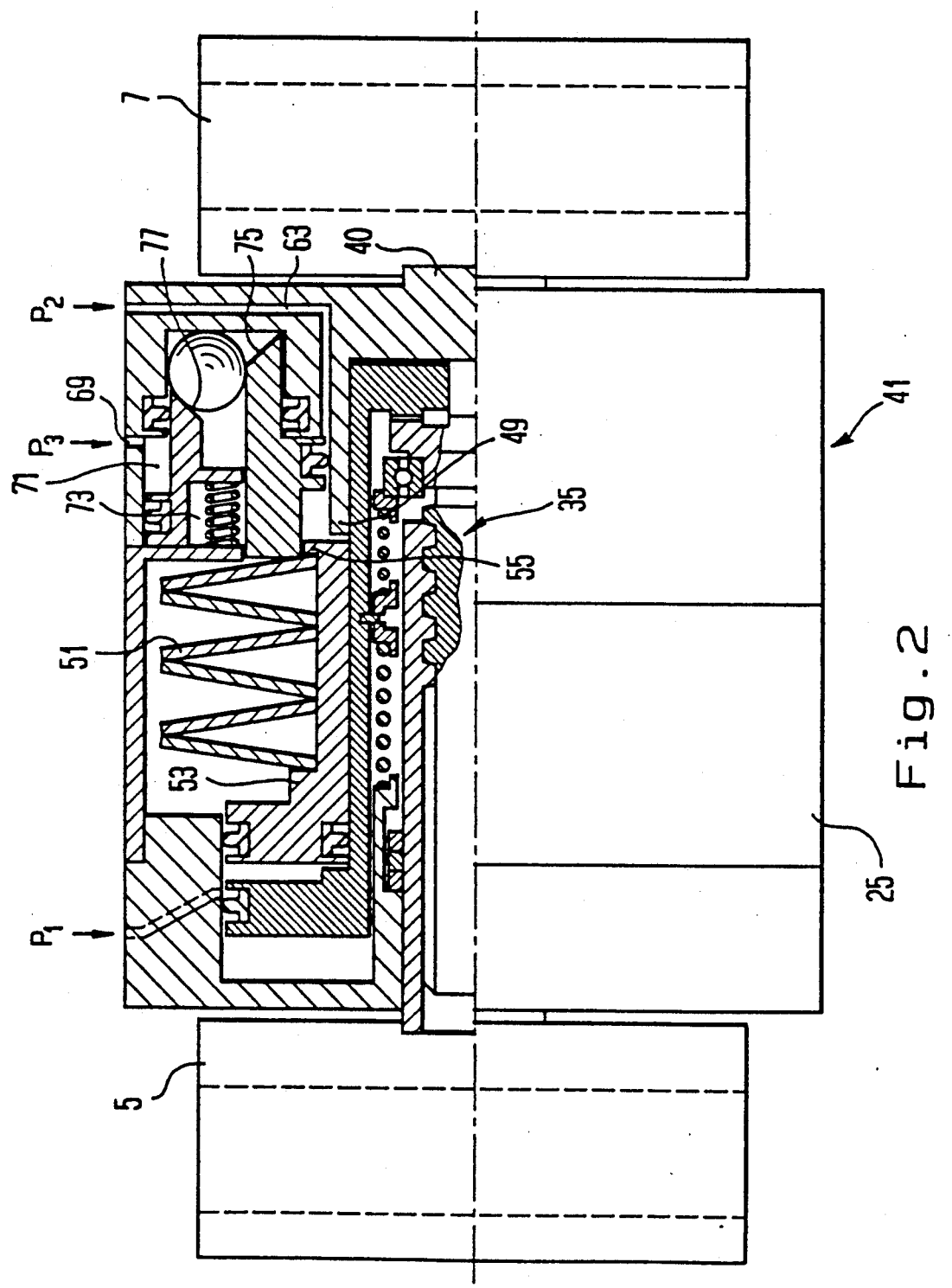
FIG. 2 is a partial sectional view of the brake cylinder, showing the released position of the parking brake.
Figure 3:
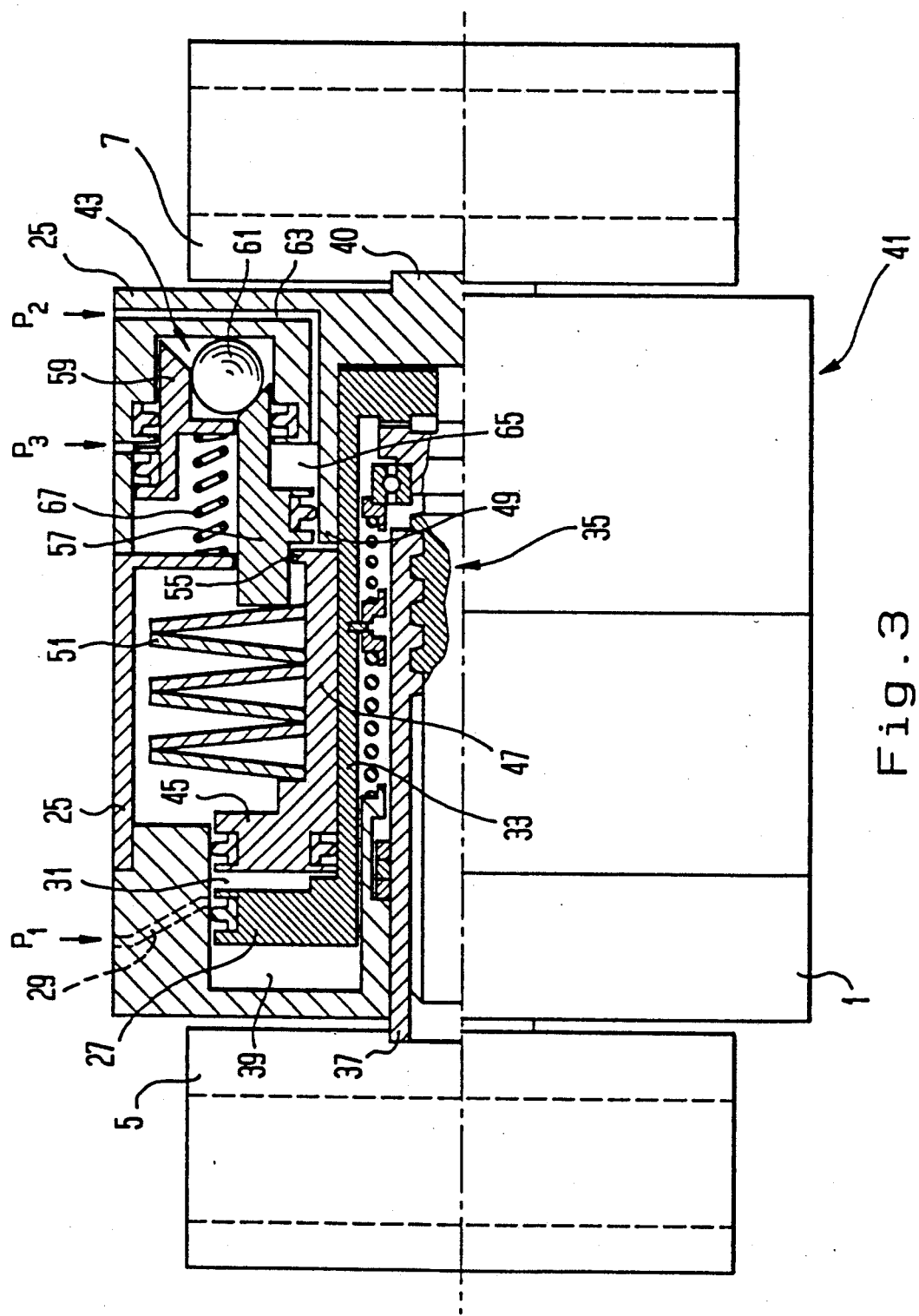
FIG. 3 is a view similar to FIG. 2, with the parking brake in locked position.

The brake cylinder 1 shown in detail in FIGS. 2 and 3 for brake systems of vehicles can be used for disc brakes of rail vehicles, for example, to clamp a caliper 3, reproduced schematically in FIG. 1 and belonging to a brake system. As shown in FIG. 1, the brake cylinder 1 is located between thrust pieces 5 and 7 on the ends of caliper levers 9 and 11, which bear brake shoes 17 and 19 provided with brake linings 13 and 15. Brake shoes 17 and 19 act on a brake disc 21, the caliper levers 9 and 11 being pivotable in the conventional manner around the pivot point of a common connecting lever 23. When the brake cylinder 1 is actuated, said connecting lever acts in both directions, i.e., caliper levers 9 and 11 diverge in the region of thrust pieces 5 and 7 so that brake shoes 17 and 19 act like grippers on the brake disc 21 and can brake said brake disc in the conventional manner. The system described up to this point is constructed and functions in the conventional manner.

However, the brake cylinder according to the invention can also be applied to known caliper designs in which the actuating piston of the brake cylinder acts directly, i.e., laterally, on a brake disc, and the yoke reaching over the brake disc is connected to the housing of the brake cylinder. Such brake cylinder and caliper constructions are used preferably in street-bound vehicles, but can also be used in rail vehicles.

The brake cylinder shown in FIG. 1 is shown in greater detail in FIGS. 2 and 3 with reference to the release position and the parking brake position of a parking brake integrated into the brake cylinder. The brake cylinder 1 in the present case is a hydraulic cylinder and has a housing 25, within which a working piston 27 is guided, loaded with pressure medium. The hydraulic pressure medium is introduced via line 29 into the pressure chamber 31 adjacent to the working piston 27. The working piston 27 of the brake cylinder of the illustrated embodiment is connected by means of an axial extension 33 and a conventional adjusting device 35 (not shown) which is positioned in the interior of the extension, to a tubular thrust piece 37 extending from housing 25. When the working piston 27 is loaded with pressure ($P_1$) and moved within the recess 39 located on the face-sided end of the housing, the thrust piece 37 is carried along in the direction of actuation, i.e., it acts on the thrust piece 5 of the caliper shown to the left in FIGS. 2 and 3 of the drawing. In response, housing 25 spreads apart to the right, as shown in FIG. 3, i.e., an opposite motion of housing 25 acts via an axial thrust piece 40 on thrust piece 7 shown on the right in FIGS. 2 and 3. When the two thrust pieces 5 and 7 are actuated, i.e., loaded, in such a manner, the caliper is actuated as described above so as to act in a braking manner on brake disc 21.

The inventive idea is realized in the structure and operating mode of the parking brake 41, associated with the brake cylinder and equipped with a locking mechanism 43 that acts both in the released position and in the parking brake position. As shown in FIGS. 2 and 3, pressure chamber 31 is defined by a component hereinafter referred to as a tandem piston 45. When the actual service brake is actuated in the normal manner, i.e., when the working piston 27 is loaded, tandem piston 45 is subjected to the pressure within pressure chamber 31. Since the tandem piston abuts by means of an axial extension 47 against a stop 49 extending axially from housing 25, the force exerted on tandem piston 45 when loaded with pressure, is directed to the right, i.e., transmitted in the direction of thrust piece 7. At the same time, tandem piston 45 serves as the carrier for springs, such as plate springs 51, which are guided under prestress at the outer circumference of the tandem piston. As shown in FIG. 2, plate springs 51 in released position abut against a left-sided shoulder 53 of the tandem piston and on a right-sided shoulder 55 at the end of axial extension 47, resulting in the minimum amount of prestress according to the distance between shoulder 53 and shoulder 55. Plate springs 51 in the parking brake position abut with their right end, as shown in FIG. 3, against a parking brake piston 57, which, jointly with a locking piston 59 and locking elements, spaced on the periphery, e.g., in the shape of balls 61, constitutes the locking mechanism 43 of the parking brake. Parking brake piston 57 can be loaded by introducing a hydraulic medium $P_2$, supplied via a line 63 into a pressure chamber 65, and can be moved to the left against the pre-stress of plate springs 51, as will be explained hereinbelow. Since parking brake piston 57 abuts against plate springs 51, the force exerted by said parking brake piston is conveyed by way of the plate spring packet to tandem piston 45, and from the latter to the adjacent working piston 27, i.e., through pressure loading of the parking brake piston 57, working piston 27 and thus thrust piece 37 are moved to the left. Since the hydraulic pressure in pressure chamber 65 also bears against the housing, i.e., on the inner wall of the housing, the result is a shifting of housing 25 to the right as a reaction to the aforementioned shifting of the parking brake piston 57, with the consequence that thrust piece 7 is also loaded when parking brake piston 57 is actuated.

The locking piston 59, associated with parking brake piston 57 and arranged radially outside it, is clamped by several springs 67 into the position shown on the right in FIG. 3, and can be loaded by the hydraulic medium $P_3$ in the same manner as the parking brake piston. The hydraulic medium can be introduced through opening 69 into a pressure chamber 71 defined by locking piston 59, wherein the hydraulic medium is in a position to compress the springs 67 arranged on the periphery in an annular chamber 73, as shown in FIG. 2.

Both parking brake piston 57 and locking piston 59 are provided with wedge-shaped locking surfaces 75 and 77, which, jointly with the locking elements in the form of balls 61, contribute to locking the braking brake in either parking brake position or release position, as will be explained below. In the position shown in FIG. 2, the parking brake is located in release position, in which pressure chamber 65 is devoid of pressure, plate springs 51 having moved parking brake piston 57 into its right hand end position, as shown in FIG. 2. This displacement is possible only after locking piston 59 has been moved into its illustrated left end position, by introduction of the hydraulic medium into pressure chamber 71, in such a manner that balls 61 could move from the FIG. 3 position to the FIG. 2 position.

FIG. 3 shows the locking position in the parking brake situation in which, in the same manner as in the aforementioned release position, the pressure in the pressure chamber 65 and pressure chamber 71 can be relieved, when the balls 61 are in the illustrated locking position, i.e., in a position in which parking brake piston 57 can no longer be returned by the plate springs into its right hand initial position, since balls 61 oppose such return. When the balls are moved from the radially outer locking position of FIG. 2 to the radially inner locking position of FIG. 3, the two locking surfaces 75 and 77 are alternately effective, i.e., after movement of the parking brake piston 57 into its left hand end position, the locking surface 77 of locking piston 59 becomes effective and pushes balls 61 radially inwardly, whereas, when the pressure chamber 71 is loaded with pressure and when the locking piston 59 is moved to the left, the locking surface 75 of the parking brake piston becomes effective and moves balls 61 at the front end relative to locking piston 59 into the radially outer region that has become free at this stage.

The operation of the brake cylinder with integrated parking brake will now be described.

Direct active braking, i.e., service braking assisted by working piston 27 by introduction of hydraulic medium into pressure chamber 31, has already been explained above.

If a vehicle, e.g., a rail vehicle, is to be parked, this is done by engaging the parking brake. To assure that the parking brake remains in the parking brake position even when the pressure drops or the hydraulic pressure medium supply fails, the above-described blocking and locking device is provided. To engage the parking brake, starting from the release position of FIG. 2, a hydraulic pressure medium is introduced into line 63 and pressure chamber 65, with the result that parking brake piston 57 is moved to the left (FIG. 3) and, upon compression of the packet of plate springs 51, acts on tandem piston 45 and thus on adjacent working piston 27, so that thrust piece 37 is moved out by means of interactive readjusting device 35, i.e., according to FIG. 3, to the left. At the same time, housing 1 is spread apart in the opposite direction, i.e., both thrust pieces 5 and 7 are loaded and the caliper closes with respect to brake disc 21. As brake piston 57 moves to the left, locking piston 59, starting from the FIG. 2 position, can move into the position shown in FIG. 3, subject to the action of the pre-stressed springs 67, since movement of the parking brake piston causes the radially inner chamber to become free to receive balls 61. Upon reaching the locking position of FIG. 3, i.e., the parking brake position, the pressure at the pressure chamber 65 can be reduced, so that the parking brake position is maintained merely by mechanical means; unintentional release is completely ruled out. During the aforementioned parking braking, pressure chamber 31 remains free of pressure, i.e., the service brake is inactive while the parking brake is actuated.

To release the parking brake from the FIG. 3 position into the FIG. 2 position, it is necessary that balls 61 can be moved radially outwardly in order to bring the locking mechanism into the position shown in FIG. 2. To this end, a hydraulic medium is introduced into pressure chamber 71 in order to move locking piston 59 against the force of springs 67 into its left hand end position as shown in FIG. 2, with the result that the packet of plate springs 51 can move parking brake piston 57 into its right end position when the pressure chamber 65 is without pressure, and as a consequence thereof, locking surface 75 forces balls 61 into the radially external free space released by locking piston 59. In this position, shown in FIG. 2, locking piston 59 is now locked when pressure chamber 71 is relieved of pressure, since balls 61 cannot escape inwardly. Even the release position of the parking brake, in which no force is exerted on thrust pieces 5 and 7, is thus without pressure, and maintained merely by mechanical means. This release position of the parking brake corresponds to the normal operating position of the brake cylinder during travel, when normally only the actual service brake is used, i.e., by loading working piston 27. As explained above, the normal service brake pressure $P_1$, which becomes effective in pressure chamber 31, has no impact on locking mechanism 43, since the extension 47 abuts against stop 49 of the housing; and thus, during service braking, relative spreading occurs between thrust piece 37 and housing 25 in order to close the caliper with respect to brake disc 21.

The described service and parking brake arrangement is especially advantageous for use in rail vehicles in which an automatic application of a parking brake upon failure of pressure from the hydraulic system is to be avoided. The parking brake can be not only engaged but also released with hydraulic or other pressure medium supplies that exist independently of one another, and even so-called "hand pump systems" or similar auxiliary systems can be used for engaging or releasing the parking brake, independently of the hydraulic working medium of the service brake.

Instead of the locking mechanism, explained with reference to the embodiment of FIGS. 2 and 3, with the aid of balls 61, it is possible to use other locking elements that can be moved in interaction with the parking brake piston and the locking piston alternately into the free space that is released as a function of the lift, in order to achieve the requisite locking positions. It is also possible to displace the parking brake piston and the locking piston purely mechanically, in which case the parking brake piston and the locking piston can each be equipped, e.g., with a spindle drive extending in their axial extension in order to carry out axial movements corresponding to the revolution of the spindle. When the locking mechanism is actuated in such a mechanical manner, sealing of the two pistons is unnecessary. It is also possible to provide the mechanical actuation as another auxiliary drive for hydraulic actuation. It is also possible to provide a spring system other than the plate springs, and to use a pneumatic pressure medium instead of a hydraulic working medium.

What is claimed is:

1. Brake cylinder for disc brakes of rail vehicles, said brake cylinder comprising service brake means arranged in a housing and having a working piston actuated by a pressure medium and acting on a brake disc by means of brake elements, and parking brake means located in a common housing with said service brake means and acting on a common actuating element, wherein
    (a) said parking brake means comprises a tandem piston (45) which defines a pressure chamber (31) for a working piston (27) of said service brake means, said tandem piston (45) being adapted to be moved to a position of abutment against said working piston (27) of said service brake means and against said housing (25) of said brake cylinder (1), whereby forces exerted by said tandem piston (45) in the direction of said working piston (27) are transmitted to a thrust piece (37) of said brake cylinder (1) and said housing (25) spreads apart in an opposite direction during service braking;
    (b) said tandem piston (45) bears on its outer periphery a packet of pre-stressed plate springs (51) adapted to be compressed by means of a parking brake piston (57) loaded by a pressure medium, whereby a force transmitted from said plate springs (51) to said tandem piston is transmitted to said working piston (27) of said service brake means and from said service brake means to said thrust piece of said brake cylinder (1);
    (c) a pressure chamber (65) of said parking brake piston (57) is defined in a spreading direction of said housing (25) by said housing, such that said housing also spreads upon actuation of said parking brake means in an opposite direction;
    (d) said parking brake piston (57) is a component of a locking means (43), said locking means comprising locking elements that respond to spring force when said parking brake piston is actuated on a rear of said locking means; and
    (e) said locking means (43) comprises a locking piston (59) adapted to be loaded by a pressure medium and to be moved against said spring force, and, in parking brake position of said parking brake piston subject to spring force, retains said locking elements in locking position with respect to said parking brake piston (57).

2. Brake cylinder, according to claim 1, wherein said locking piston (59) is adapted to be moved automatically by spring force into locking position with respect to said parking brake piston (57), and wherein, when said parking brake piston (57) is in parking brake position, said locking piston (59) is actuated with respect to balls (61) which act as locking elements and which are adapted to be moved into a position blocking automatic return of said parking brake piston (57).

3. Brake cylinder, according to claim 2, wherein said locking piston (59) is adapted to be moved automatically out of locking position into release position by means of an hydraulic pressure medium against said spring force, whereby balls (61) blocking automatic return of said parking brake piston (57) can be moved out of locking position into a space produced by moving said locking piston.

4. Brake cylinder, according to claim 3 or 2, wherein both said parking brake piston (57) and said locking piston (59) exhibit on ends thereof facing said balls (61) wedge-shaped locking surfaces (75, 77) which alternately abut against said balls (61), wherein, when said parking brake means is in locking position, said balls (61) are on said locking surface (75) of said parking brake piston (57), whereas in release position of said parking brake device said balls are in locking position on said locking surface (77) of said locking piston (59).

5. Brake cylinder, according to claim 2 or 1, wherein said working piston (27), said parking brake piston (57) and said locking piston (59) are each supplied from a separate hydraulic pressure medium supply ($P_1$; $P_2$; $P_3$), and wherein pressure medium for said parking brake piston and said locking piston is adapted to be metered by auxiliary pump means.

* * * * *